(12) United States Patent
Tseng et al.

(10) Patent No.: US 9,143,060 B2
(45) Date of Patent: Sep. 22, 2015

(54) POWER GENERATING DEVICE

(71) Applicants: Shen-Ko Tseng, Taipei (TW); Juinne-Ching Liao, Taipei (TW)

(72) Inventors: Shen-Ko Tseng, Taipei (TW); Juinne-Ching Liao, Taipei (TW)

(73) Assignee: Shen-Ko Tseng, Taipei (TW)

( * ) Notice: Subject to any disclaimer, the term of this patent is extended or adjusted under 35 U.S.C. 154(b) by 268 days.

(21) Appl. No.: 13/742,400

(22) Filed: Jan. 16, 2013

(65) Prior Publication Data

US 2013/0188341 A1   Jul. 25, 2013

(30) Foreign Application Priority Data

Jan. 16, 2012   (CN) .......................... 2012 1 0011831

(51) Int. Cl.

| | |
|---|---|
| *H02N 2/18* | (2006.01) |
| *F21L 4/08* | (2006.01) |
| *H02K 35/02* | (2006.01) |
| *H02K 35/04* | (2006.01) |
| *H02K 11/00* | (2006.01) |
| *A43B 3/00* | (2006.01) |
| *A43B 1/00* | (2006.01) |

(52) U.S. Cl.
CPC .............. *H02N 2/183* (2013.01); *A43B 1/0027* (2013.01); *A43B 3/001* (2013.01); *A43B 3/0015* (2013.01); *F21L 4/08* (2013.01); *H02K 11/0094* (2013.01); *H02K 35/02* (2013.01); *H02K 35/04* (2013.01); *H02N 2/18* (2013.01)

(58) Field of Classification Search
CPC .......... H02N 2/18; H02N 2/183; H02N 2/186
USPC ...................................................... 310/339
See application file for complete search history.

(56) References Cited

U.S. PATENT DOCUMENTS

| | | | | |
|---|---|---|---|---|
| 3,648,279 | A * | 3/1972 | Watson ........................... | 341/34 |
| 3,855,488 | A * | 12/1974 | Britton et al. ................. | 310/339 |
| 4,078,187 | A * | 3/1978 | Kanisawa et al. ............. | 310/319 |
| 5,291,872 | A * | 3/1994 | Ghaem .......................... | 123/620 |
| 5,838,138 | A * | 11/1998 | Henty ............................ | 320/107 |
| 7,812,508 | B2 * | 10/2010 | Abramovich et al. ........ | 310/339 |
| 2001/0032612 | A1* | 10/2001 | Welch et al. ................... | 123/294 |
| 2007/0114890 | A1* | 5/2007 | Churchill et al. ............. | 310/339 |
| 2007/0231944 | A1* | 10/2007 | Kvisteroy ....................... | 438/52 |
| 2008/0036307 | A1* | 2/2008 | Lu et al. ........................... | 310/15 |
| 2008/0129147 | A1* | 6/2008 | Thiesen et al. ................ | 310/319 |
| 2009/0058099 | A1* | 3/2009 | Ghassemi ..................... | 290/4 B |
| 2009/0090334 | A1* | 4/2009 | Hyde et al. .................. | 123/51 R |
| 2010/0045119 | A1* | 2/2010 | Jackson et al. ................. | 310/20 |

FOREIGN PATENT DOCUMENTS

| | | |
|---|---|---|
| CN | 2689742 Y | 4/2005 |
| CN | 1835375 A | 9/2006 |
| CN | 202513805 U | 10/2012 |

* cited by examiner

*Primary Examiner* — J. San Martin

(57) ABSTRACT

A power generating device includes a first casing, a magnetic component, a second casing, an induction coil, and a first piezoelectric device. The first casing and the second casing engage with each other to form a space, and the magnetic component is fixed on the first casing and configured in the space. The induction coil is fixed on the second casing and configured in the space, and it is positioned outside the contour of the magnetic component. The first piezoelectric is configured between the magnetic component and the first casing. When an external force acts on the first casing and the second casing, the first casing and the second casing move relatively to each other so that the induction coil generates an induced current by sensing a magnetic flux variation, and the first piezoelectric component generates a first charge by absorbing the pressure between the magnetic component and the second casing.

14 Claims, 9 Drawing Sheets

POWER GENERATING DEVICE

BACKGROUND OF THE INVENTION

1. Field of the Invention

This invention relates to a power generating device, and more particularly, to the power generating device which is capable of generating electricity energy by electromagnetic induction and piezoelectric unit.

2. Description of the Prior Art

Various products having practicability as well as energy saving function appear on marketplace with the trend of environment protection. The products generating electricity energy by simple motions achieve the energy saving function and interest to usage. For example, the flash lights generating electricity energy by hand pressing and the bicycles transforming mechanical energy to electricity energy are practical products with electricity energy generating ability.

On the other hand, the traffic accidents may happen easily on the pedestrian if he walks in the night or in a somber environment. Therefore, the pedestrian often needs to wear reflective or lighting accessory to increase the identification rate in the night. The lighting accessory containing thin battery can be carried by the pedestrian to increase the identification rate. However, the thin battery includes mercury and it may make environment pollution. Besides, the thin battery may have leakage, damp, or damage problems if the lighting accessory is not applied enough waterproof mechanism.

As described above, if the lighting accessory can generate electricity energy by simple motions and the structure of the lighting accessory is simple enough to avoid high-specification waterproof mechanism, the mercury battery can be removed from the light accessory so that the light accessory can be worn all day to improve the traffic safety of the pedestrian. Therefore, the above-mentioned lighting accessory is highly practical and becomes an important research subject.

SUMMARY OF THE INVENTION

One object of the present invention is to provide a power generating device capable of generating electricity energy by simple motions. The power generating device needs no mercury battery with high pollution and generates LED light source to improve the traffic safety of the pedestrian.

According to an embodiment of the invention, the power generating device includes a first casing, a second casing, a magnetic component, an induction coil, and a first piezoelectric component. The first casing has at least one first engagement part. The second casing has at least one second engagement part which is movably coupled to the first engagement part to form a space between the first casing and the second casing. The magnetic component is fixed on the first casing and configured in the space. The induction coil is fixed on the second casing and configured in the space, and it is positioned outside the contour of the magnetic component. The first piezoelectric component is configured between the magnetic component and the second casing. When an external force acts on the power generating device, the first casing and the second casing move relatively to each other so that the induction coil generates an induced current by sensing a magnetic flux variation, and the first piezoelectric component generates a first charge by absorbing the pressure between the magnetic component and the second casing.

In practice, the power generating device of the invention further includes an electricity storing module, a lighting module, and a control module. The electricity storing module is coupled to the induction coil and the first piezoelectric component to receive the induced current and the first charge and store them as a stored electrical energy. The lighting module is coupled to the electricity storing module and has at least one LED unit, where the electricity storing module provides the stored electrical energy to the LED unit. The control module is coupled to the lighting module for controlling the frequency, color, or pattern of the light emitted by the lighting module.

Besides, the power generating device can further include an elastic component configured between the first casing and the second casing. When the external force acts on the power generating device, the first casing and the second casing move relatively to each other and the elastic component provides a recovery force.

The power generating device can further include a third casing contacting the first casing and having a third engagement part for engaging the first engagement part. When the external force acts on the power generating device, the second casing and the third casing move relatively to each other.

The first engagement part can be a protruding structure and the second engagement part can be a concave structure, and the protruding structure and the concave structure can be coupled to each other, however, it is not a limitation. In another embodiment, the first engagement part and the second engagement part include a sliding rail, and the first engagement part and the second engagement part move relatively along the sliding rail. The third casing can be a bowl structure to contain the second casing, and the elastic component can be configured between the second casing and third casing. The elastic component provides a recovery force when the second casing and the third casing move relatively to each other.

According to another embodiment of the present invention, the power generating device includes a first casing, a second casing, a magnetic component, an induction coil, a third casing, and a second piezoelectric component. The first casing, the second casing, the magnetic component, and the induction coil have been described in the above paragraphs, so they would not be repeated here. The third casing has a third engagement part for engaging the first engagement part. The second piezoelectric component is configured between the second casing and the third casing. When an external force acts on the power generating device, the first casing and the second casing move relatively to each other so that the induction coil generates an induced current by sensing a magnetic flux variation, and the second piezoelectric component generates a second charge by absorbing the pressure between the second casing and the third casing. The power generating device can further include an elastic component in practice.

The elastic component can be configured between the first casing and the second casing. When the external force acts on the power generating device, the first casing and the second casing move relatively to each other, and the elastic component provides a recovery force.

In another embodiment, the elastic component can be also configured between the second casing and the third casing. When the external force acts on the power generating device, the second casing and the third casing move relatively to each other, and the elastic component provides a recovery force. The second casing and the third casing can be a bowl structure respectively, and the second casing can be contained in the third casing. The third engagement part can be a convex ring fixed on the inside wall of the third casing for blocking the first engagement part.

The power generating device of the invention further includes an electricity storing module, a lighting module, and a control module in this embodiment. The electricity storing module is coupled to the induction coil and the first piezoelectric component to receive the induced current and the first charge and store them as a stored electrical energy. The lighting module is coupled to the electricity storing module and has at least one LED unit, where the electricity storing module provides the stored electrical energy to the LED unit. The control module is coupled to the lighting module for controlling the frequency, color, or pattern of the light emitted by the lighting module. Besides, a first piezoelectric component can be configured between the first casing and the second casing. When an external force acts on the power generating device, the first casing and the second casing move relatively to each other, and the first piezoelectric component generates a first charge by absorbing the pressure between the magnetic component and the second casing and transfers the first charge to the electricity storing module.

As described above, the power generating device can be used in the shoe pads or the ground pads. When a user steps on or presses the power generating device, it generates and stores an inducted current by electromagnetic induction to supply the LED to light. Therefore, the power generating device of the invention can be assembled in the shoes easily to automatically generate the electricity energy with the user's walking. It should be noted that the light module of the power generating device of the invention increases the identification rate in the night, and improves the traffic safety of the user.

On the advantages and the spirit of the invention, it can be understood further by the following invention descriptions and attached drawings.

BRIEF DESCRIPTION OF THE APPENDED DRAWINGS

DETAILED DESCRIPTION OF THE INVENTION

Figure 1:
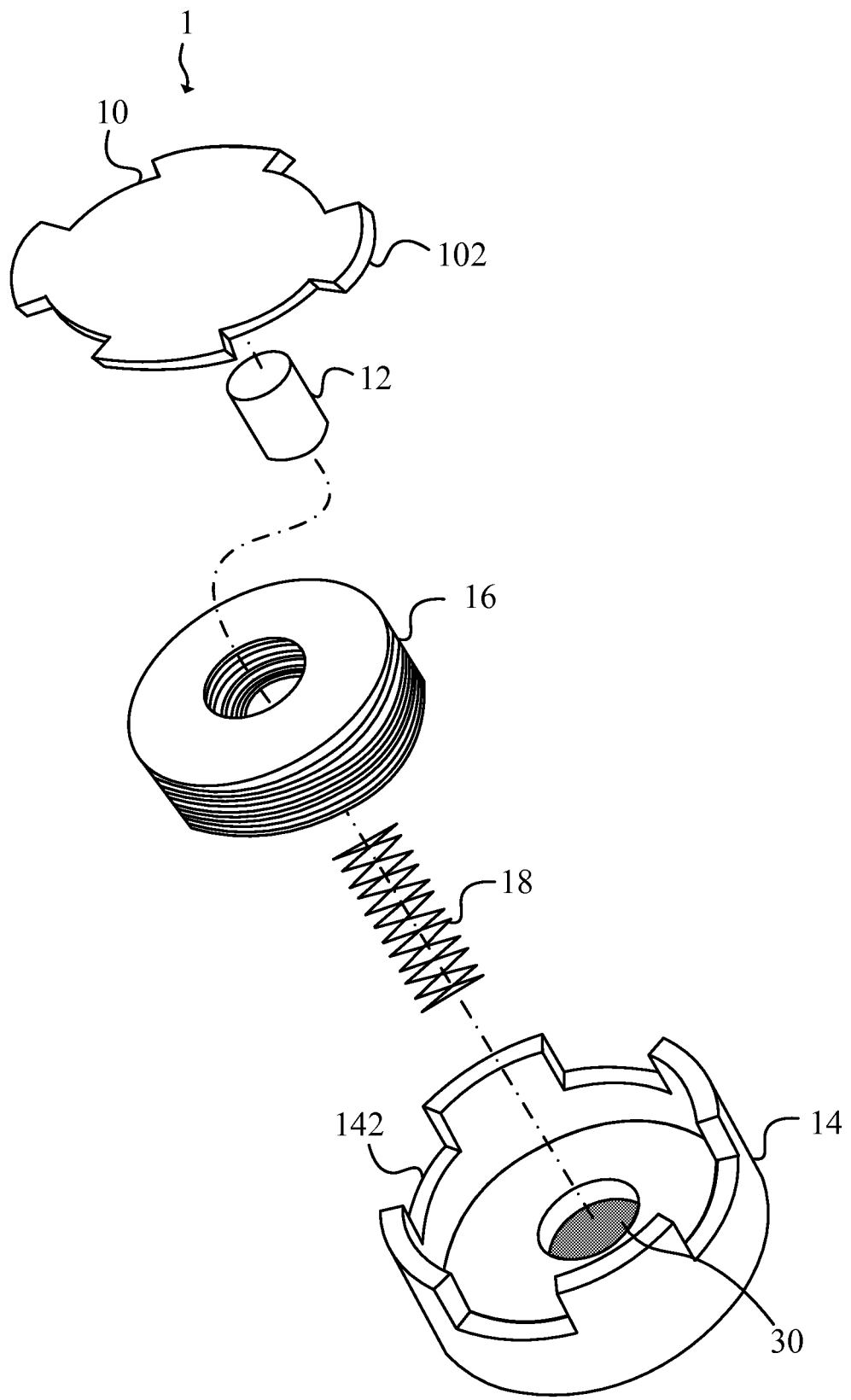
FIG. 1 is an explosion diagram illustrating a power generating device according to an embodiment of the invention.

Please refer to FIG. 1. FIG. 1 is an explosion diagram illustrating a power generating device according to an embodiment of the invention. As shown in FIG. 1, the power generating device 1 includes a first casing 10, a magnetic component 12, a second casing 14, an induction coil 16, and a first piezoelectric component 30. The first casing 10 and the second casing 14 can be matched to each other and together form a space. The magnetic component 12 and the induction coil 16 can be configured in the space.

The first casing 10 has at least one first engagement part 102. In practice, the first engagement part 102 can be integrally fixed on the first casing 10. The shape of the first casing 102 can be other suitable shapes but not limited to the fan-shaped one shown in FIG. 1.

The magnetic component 12 is fixed on the first casing 10. In practice, the magnetic component can be fixed on the surface of the first casing 10 and configured in the space formed by the first casing 10 and the second casing 14. The material of the magnetic component 12 is not limited in this embodiment. For example, the magnetic component 12 can be made of neodymium magnet or other suitable component which provides magnetic force.

The second casing 14 has at least one second engagement part 142, which can being movably coupled to the first engagement part 102, so as to make the first casing 10 and the second casing 12 closed to form the space. The shape of the second engagement part 142 matches that of the first engagement part 102. For example, the first casing 10 can be a cover and the second casing 14 can be a bowl structure, and the first engagement part 102 and the second engagement part 142 can be used for guiding the directions of the relative motions of the first casing 10 and the second casing 14. In detail, the first engagement part 102 and the second first engagement part 142 can be groove, sliding rail, or other suitable structure to enable the first casing 10 and the second casing 14 to move relatively to each other.

The induction coil 16 is fixed on the second casing 14 and configured in the space, and it is positioned outside the contour of the magnetic component 12. When an external force F acts on the power generating device 1 or the first casing 10 and the second casing 14 thereof, the first engagement part 102 and the second engagement part 142 move relatively to each other, so that the induction coil 16 generates an induced current by sensing a magnetic flux variation of the magnetic component 12. In practice, the induction coil 16 is positioned outside the contour of the magnetic component 12, and the induction coil 16 generates the induced current by sensing the magnetic flux variation of the magnetic component 12 caused by the relative displacement when the magnetic component 12 and the induction coil 16 move relatively to each other by the external force F.

The first piezoelectric component 30 is configured between the magnetic component and the second casing. In practice, the first piezoelectric component 30 can be configured between the magnetic component and the surface corresponding to the magnetic component of the second casing. When the surface of the magnetic component 12 contacts the second casing 14, the magnetic component 12 exerts a pressure on the second casing 14 to make a deformation of the first piezoelectric component 30, and the first piezoelectric component 30 generates a first charge by absorbing the pressure between the magnetic component 12 and the second casing 14. In detail, the first piezoelectric component 30 deforms so that a potential difference between the two opposite surfaces of the first piezoelectric component 30 is introduced to generate the first charge corresponding to the pressure when bearing the external force F.

Figure 2A:
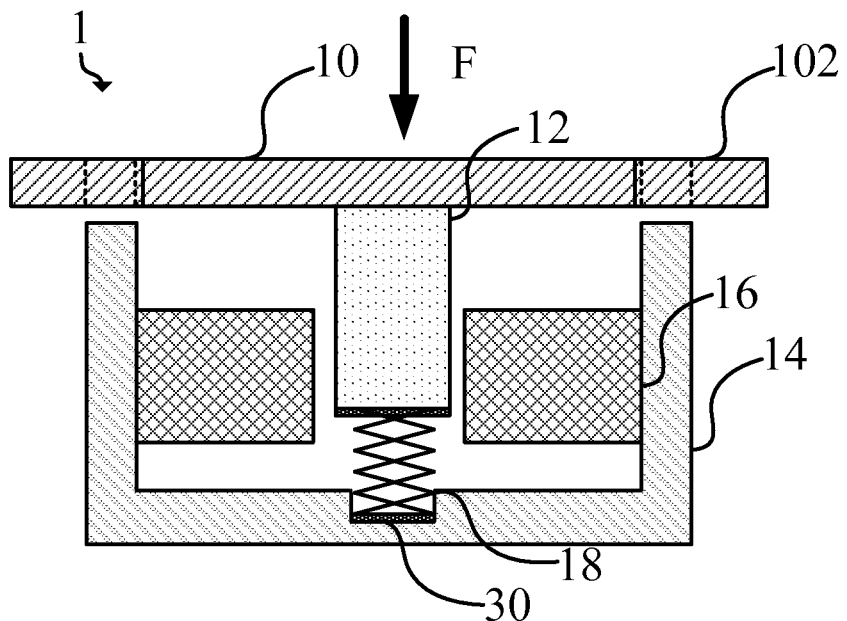
FIG. 2A is a sectional diagram illustrating a power generating device before the external force acts according to another embodiment of the invention.
Figure 2B:
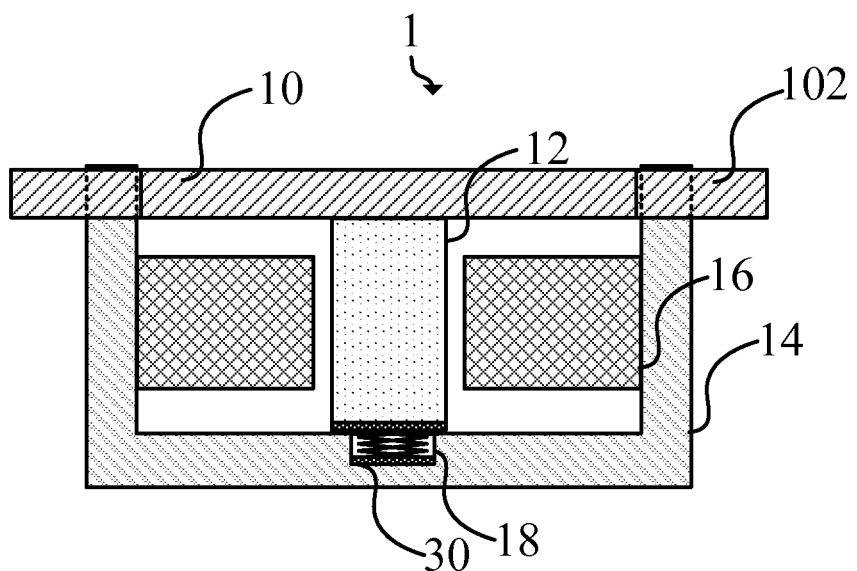
FIG. 2B is a sectional diagram illustrating a power generating device when the external force acts according to another embodiment of the invention.

In practice, the power generating device 1 further includes an elastic component configured between the first casing and the second casing. The elastic component provides a recovery force to the first casing and the second casing when the first casing and the second casing move relatively to each other. The recovery force provided by the elastic component is to against the external force F when the external force F acts on the first casing 10 and the second casing 14 to force them moving relatively to each other. Please refer to FIG. 1, FIG. 2A, and FIG. 2B. FIG. 2A is a sectional diagram illustrating a power generating device before the external force F acts according to another embodiment of the invention. FIG. 2B is a sectional diagram illustrating a power generating device when the external force F acts according to another embodiment of the invention. As shown in the figures, the power generating device 1 includes an elastic component 18 configured in the space formed by the first casing 10 and the second casing 14 closing. When the external force F acts on the first casing 10 and the second casing 14, the elastic component 18 provide a recovery force against the external force F. For example, when the power generating device 1 is acted by the external force F shown in FIG. 2B, the first casing 10 and the second casing 14 move relatively to each other causing a replacement, and the directions of the relative motion and the displacement of them are guided by the first engagement part 102 and the second engagement part 142. In this embodiment, the directions of the relative motion and the displacement of the first casing 10 and the second casing 14 are parallel to the external force F.

Before the external force F acts on the power generating device 1, the magnetic circuit formed by the magnetic component 12 and the induction coil 16 is not closed, and the magnetic flux is smaller. On the other hand, when the external force F acts on the power generating device 1, the magnetic circuit formed by the magnetic component 12 and the induction coil 16 is closed, and the magnetic flux is larger. The induction coil 16 senses the magnetic flux variation to generate inducted current and induction voltage. In practice, to provide larger magnetic flux variation, the elastic component 18 can be embedded in the second casing 14 to enable the magnetic component 12 and the second casing contact to each other when the magnetic circuit is closed. However, it is not a limitation. The elastic component 18 has enough effect even though the elastic component 18 is not embedded in the second casing 14.

Figure 2C:
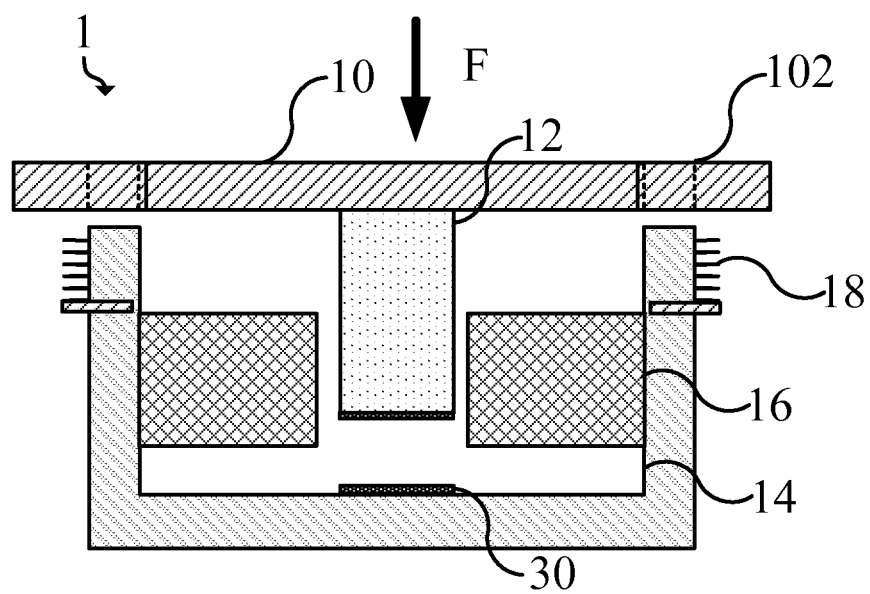
FIG. 2C is a sectional diagram illustrating a power generating device before the external force acts according to another embodiment of the invention.
Figure 2D:
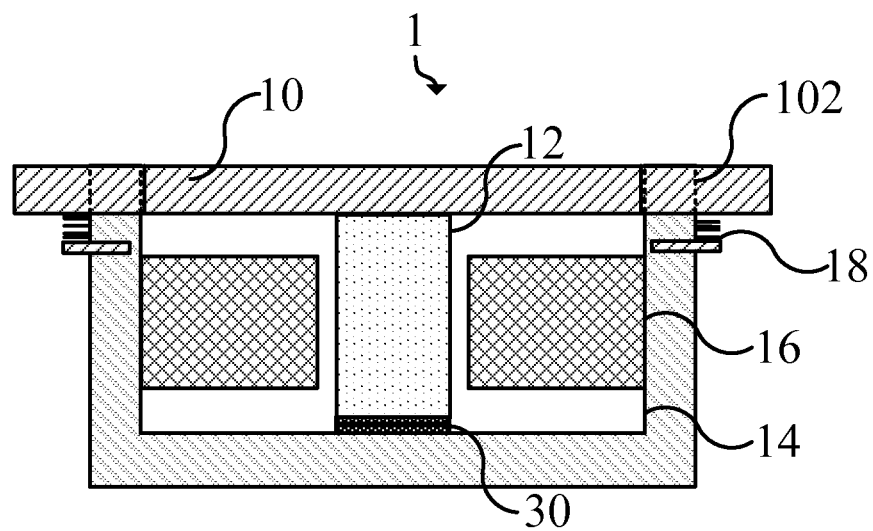
FIG. 2D is a sectional diagram illustrating a power generating device when the external force acts according to another embodiment of the invention.

It should be noted that the elastic component 18 is just configured between the first casing 10 and the second casing 14 to provide the recovery force against the external force F in this embodiment, and one skilled in the art can arrange the elastic component 18 to any position between the first casing 10 and the second casing 14. The elastic component 18 can be spring, elastic piece, or other elastic objects. Please refer to FIG. 2C and FIG. 2D. FIG. 2C is a sectional diagram illustrating a power generating device before the external force F acts according to another embodiment of the invention. FIG. 2D is a sectional diagram illustrating a power generating device when the external force F acts according to another embodiment of the invention. As shown in the figures, the elastic component 18 is configured between the first engagement part 102 of the first casing 10 and the second engagement part 142 of the second casing 14 to provide the recovery force against the external force F. By coupled to or embedded in the outside wall or a fixing structure of the inside wall of the second casing 14, the elastic component 18 can be held on the surface of the second casing 14 and provide a force opposite to the external force F. In addition, the shape of the fixing structure is corresponding to the inside wall or outside wall of the second casing 14.

Figure 3A:
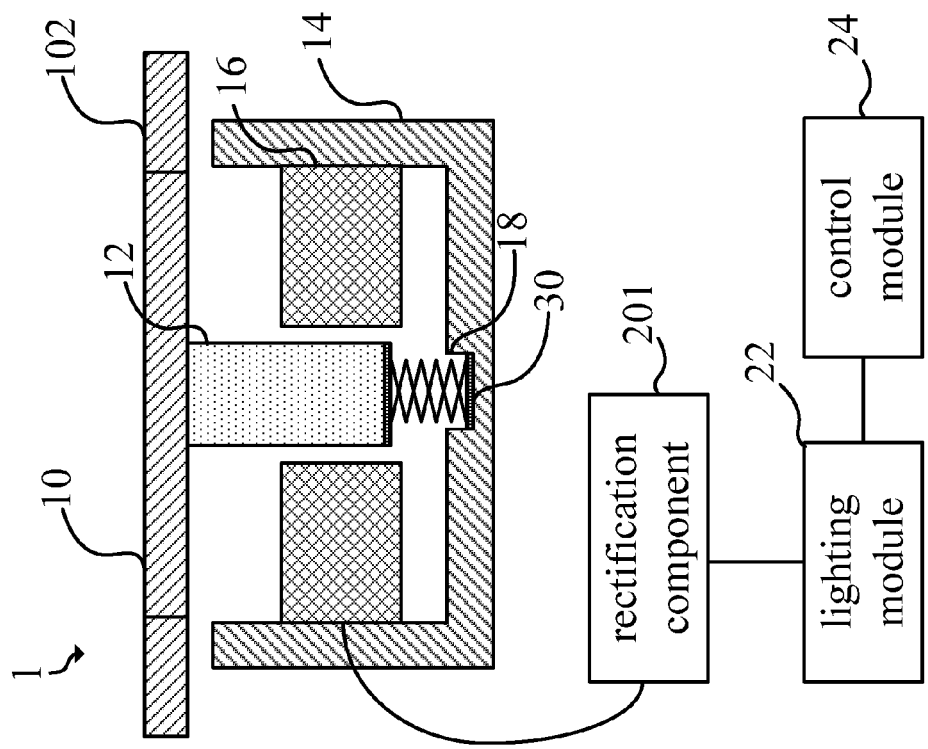
FIG. 3A is a schematic drawing illustrating a power generating device according to another embodiment of the invention.

In practice, the power generating device 1 can be used in the shoe pads, ground pads, pedal, or other suitable device, and further include lighting module, electricity storing module, and control module for putting the generated electrical energy in use. Please refer to FIG. 3A. FIG. 3A is a schematic drawing illustrating a power generating device according to another embodiment of the invention. As shown in FIG. 3A, the power generating device 1 further includes an electricity storing module 20, a lighting module 22, and a control module 24. The electricity storing module 20 is coupled to the induction coil 16 and the first piezoelectric component 30, so as to receive the induced current generated by the induction coil 16 and the first charge generated by the first piezoelectric component 30 and store them as a stored electrical energy. The stored electrical energy in electricity storing module 20 can be provided to the lighting module 22 and the control module 24.

Figure 3B:
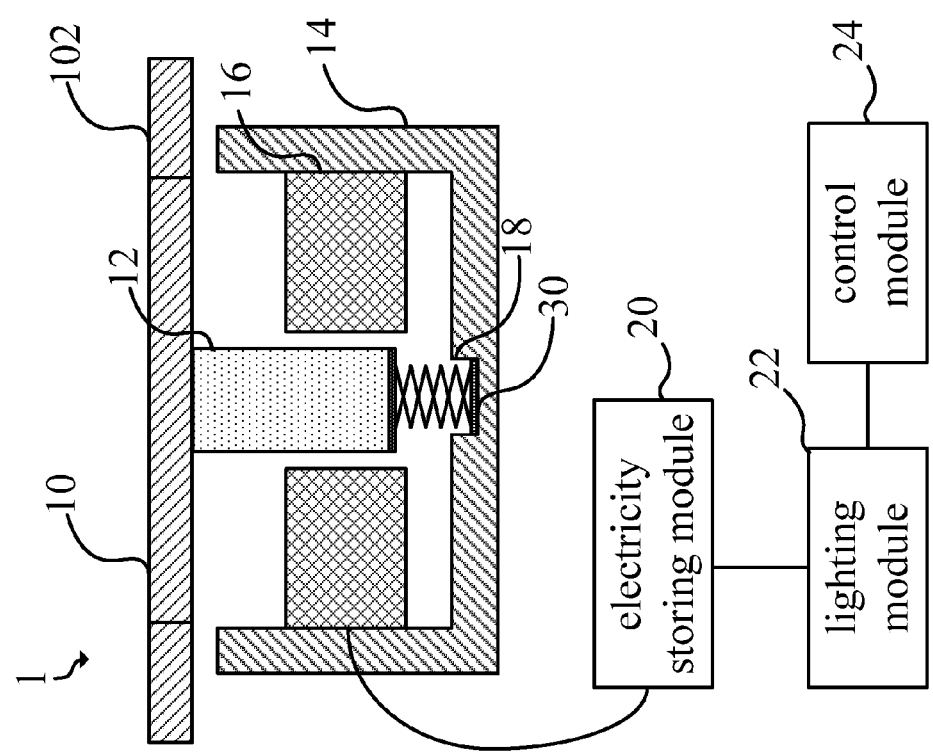
FIG. 3B is a schematic drawing illustrating a power generating device according to another embodiment of the invention.

The lighting module 22 has at least one LED unit. The electricity storing module 20 can provide the stored electrical energy to the lighting module 22 to enable the LED unit to emit light. The control module 24 is coupled to the lighting module 22 for a user to control the frequency, color, or pattern of the light emitted by the lighting module 22. In practice, the power generating device 1 can be used as the LED light source with power generating function by stepping. By the user exerting the external force F on the shoe pads or ground pads at walking, the LED unit emits light so that the power generating device needs no additional battery and becomes a green product. It should be noted that the electricity storing module 20 or the control module 24 can be selectively omitted and the lighting module 22 is kept according to the cost or the design. If the electricity storing module 20 is omitted, each of the power generating devices 1 in the above embodiments can be directly connected to the lighting module 22 or connected to the lighting module 22 through a rectification component 201, which is capable of rectifying or adjusting the charges or inducted currents to output a stable electrical energy, as shown in FIG. 3B. FIG. 3B is a schematic drawing illustrating a power generating device according to another embodiment of the invention.

Please refer to FIG. 3A once again. In the embodiment, the external force F acts on the first casing 10, and the second casing 14 is fixed on the shoe pads, ground pads, pedals, or other suitable devices, so that the first casing 10 can move relatively to the second casing 14 when the external acts on the first casing 10. However, it is not a limitation. For example, the external force F can act on the second casing 14 to make the first casing 10 and the second casing 14 to move relatively to each other.

Figure 4:
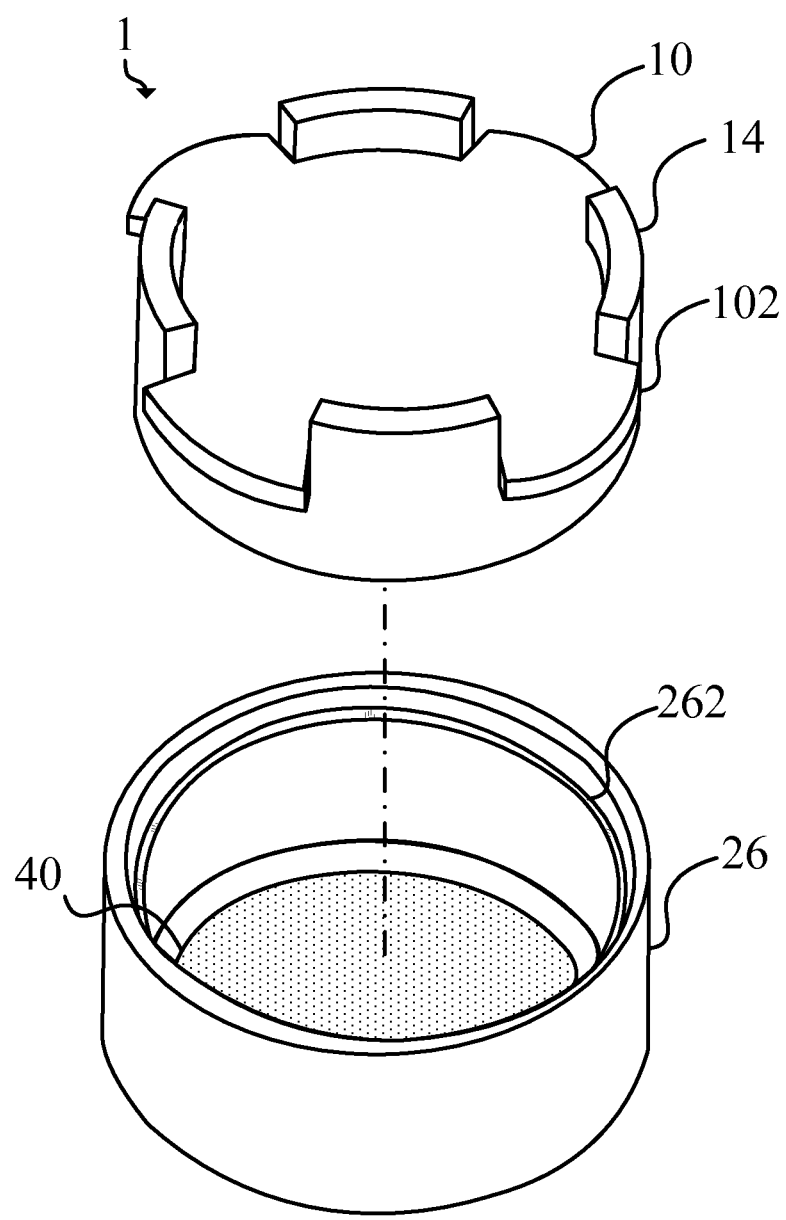
FIG. 4 is a schematic drawing illustrating a power generating device according to the embodiment of the invention.
Figure 5A:
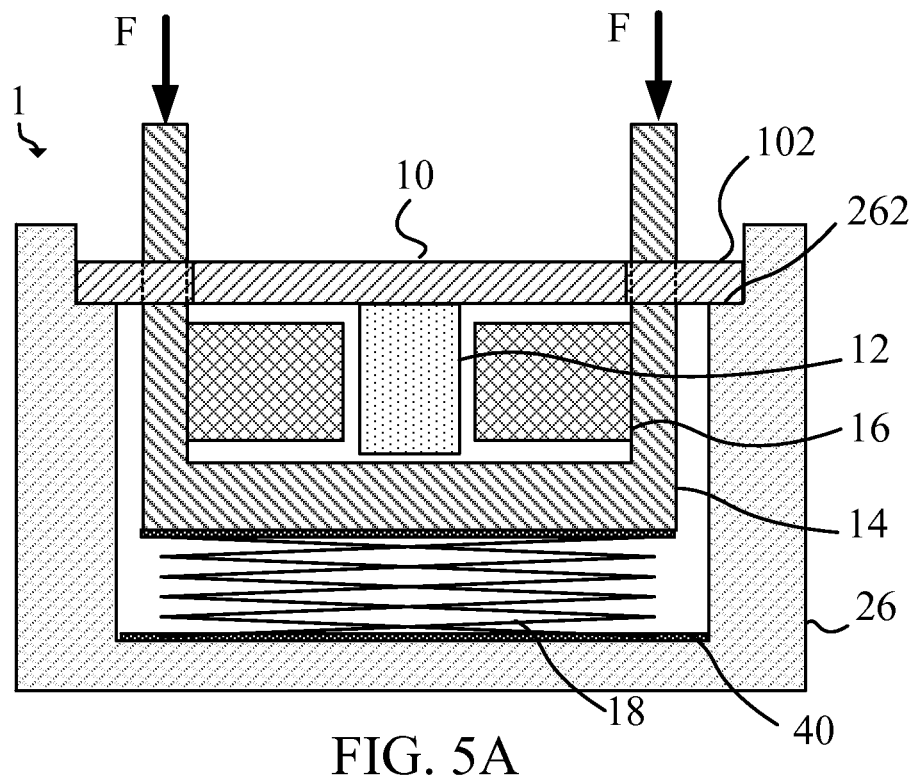
FIG. 5A is a sectional diagram illustrating a power generating device before the external force acts according to the embodiment of the invention.
Figure 5B:
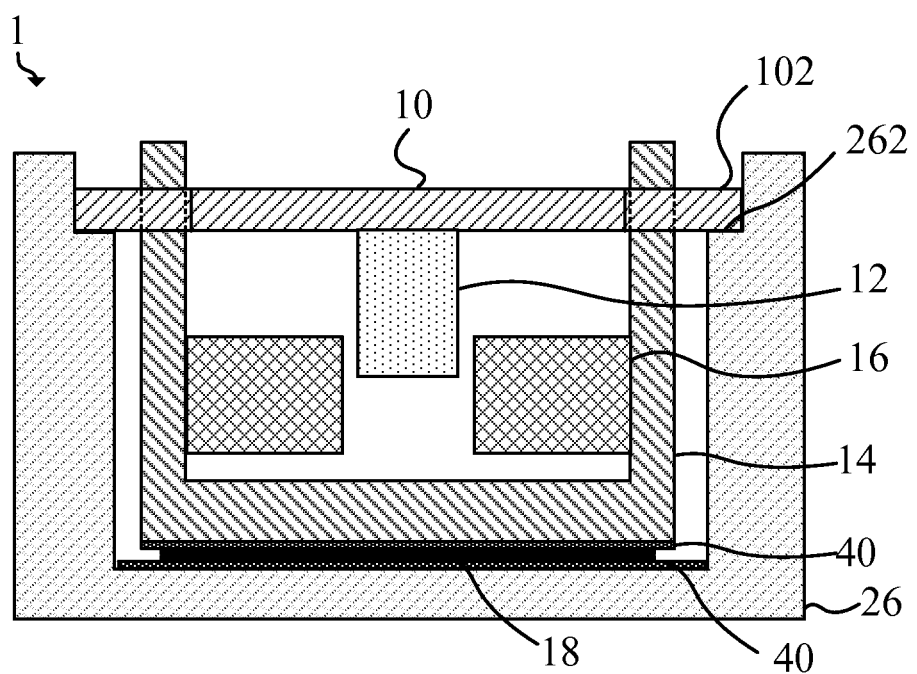
FIG. 5B is a sectional diagram illustrating a power generating device when the external force acts according to the embodiment of the invention.

In another embodiment, the first power generating device can further include a third casing and a second piezoelectric component 40, and the external force F acts on the second casing of the power generating device. Please refer to FIG. 4, FIG. 5A, and FIG. 5B. FIG. 4 is a schematic drawing illustrating a power generating device according to the embodiment of the invention. FIG. 5A is a sectional diagram illustrating a power generating device before the external force F acts according to the embodiment of the invention. FIG. 5B is a sectional diagram illustrating a power generating device when the external force F acts according to the embodiment of the invention. As shown in the figures, the power generating device 1 includes a third casing 26 contacting the first casing 10 and having a third engagement part 262 for engaging the first engagement part 102.

When the external force F acts on the second casing 14, the third engagement part 262 engages the first engagement part 102 to prevent the third casing 26 and the first casing 10 from relative motion, so that the external force F can be applied for the second casing 14 to move relatively to the first casing 10 and the second casing 26. The difference between this embodiment and the above embodiments shown in FIG. 1, FIG. 2A, and FIG. 2B is that the elastic component 18 is configured between the second casing 14 and the third casing 26. When the second casing 14 and third casing 26 move relatively to each other, the elastic component 18 provides a recovery force against the external force F. The third engagement part 262 is a convex ring fixed on the inside wall of the third casing 26 for blocking the first engagement part 102.

It should be noted that the external force F acts on the opening of the second casing 14 to push the second casing 14 to move toward the third casing 26. Therefore, the elastic component 18 is configured between the second casing 14 and the third casing 26 and provides a recovery force against the external force F. One skilled in the art can arrange the elastic component 18 to any position between the second casing 14 and the third casing 26.

Figure 5C:
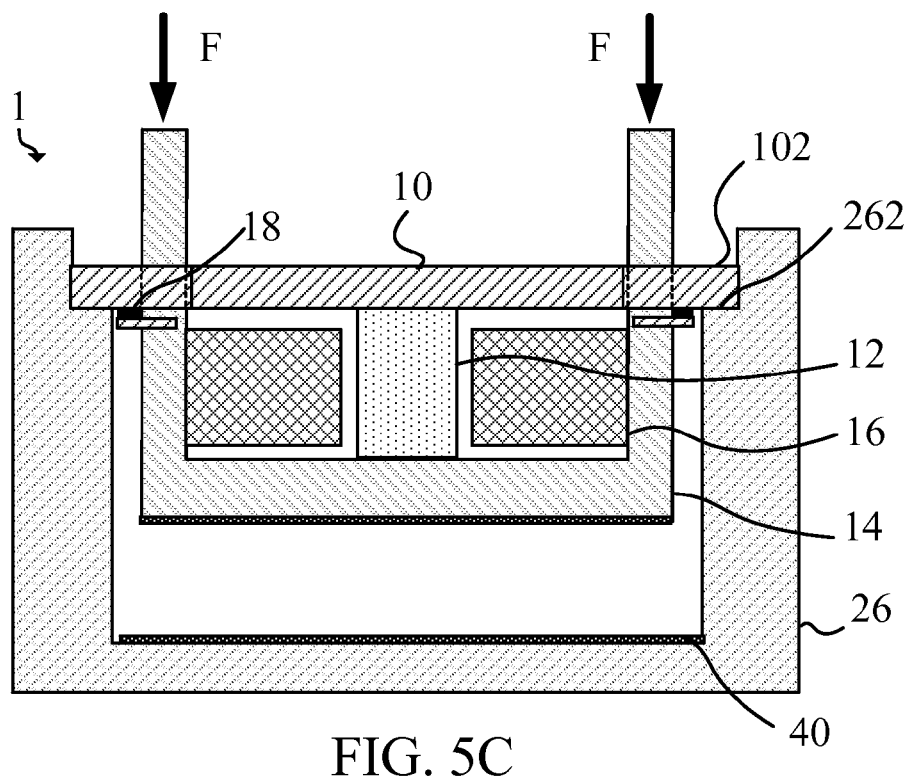
FIG. 5C is a sectional diagram illustrating a power generating device before the external force acts according to the embodiment of the invention.
Figure 5D:
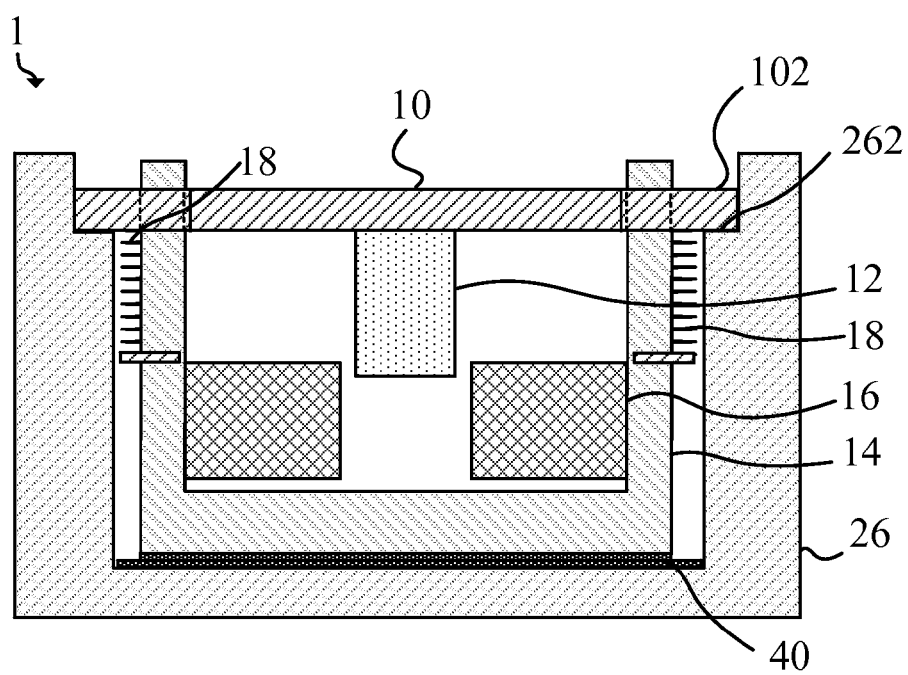
FIG. 5D is a sectional diagram illustrating a power generating device when the external force acts according to the embodiment of the invention.

The external force F acts on the power generating device 1 shown in FIG. 2 to press the magnetic component 12 into the induction coil 16, and the magnetic component 12 needs the recovery force, provided by the elastic component 18, to overcome the magnetic attraction and move out from the induction coil 16. However, the power generating device 1 shown in FIG. 5A and FIG. 5B has enough effect even if the elastic component 18 is removed. In practice, the magnetic component 12 in FIG. 5A and FIG. 5B can recover to the original position by magnetic attraction after the magnetic component 12 is drawn out from the induction coil 16 by the external force F. That is to say, the elastic component 18 is an auxiliary component but not an essential component. Please refer to FIG. 5C and FIG. 5D. FIG. 5C is a sectional diagram illustrating a power generating device before the external force F acts according to the embodiment of the invention. FIG. 5D is a sectional diagram illustrating a power generating device when the external force F acts according to the embodiment of the invention. As shown in the figures, the elastic component 18 can be configured between the first engagement part 102 and the second engagement part 142 to provide a recovery force against the external force F to the first casing 10. The difference between this embodiment and the above-mentioned embodiments is that the elastic component 18 extends when the external force F acts on the second casing 14, and provides a opposite force to recover the second casing 14 to the original position when the external force F vanishes.

Please refer to FIG. 5A and FIG. 5B again. The second piezoelectric component 40 is configured between the second casing 14 and the third casing 26. The second piezoelectric component 40 absorbs the pressure between the second casing 14 and the third casing 26 to deform and generate a second charge. In detail, when the second casing 14 is forced and then presses the third casing 26, the piezoelectric component 40 deforms by the pressure and generates the charge corresponding to the pressure. The electricity storing module 20 can be further coupled to the second piezoelectric component 40 to receive and store the inducted current and the second charge generating by the induction coil 16 and the second piezoelectric component 40. The stored electrical energy stored in the electricity storing module 20 can be provided to lighting module 22 and the control module 24. The elastic component 18 in this embodiment can be configured as those in above-mentioned embodiment shown in FIG. 2A and FIG. 2B. It should be noted that the electricity storing module 20 or the control module 24 can be selectively omitted, and the lighting module 22 can be directly connected to the units for generating electrical energy.

Figure 5E:
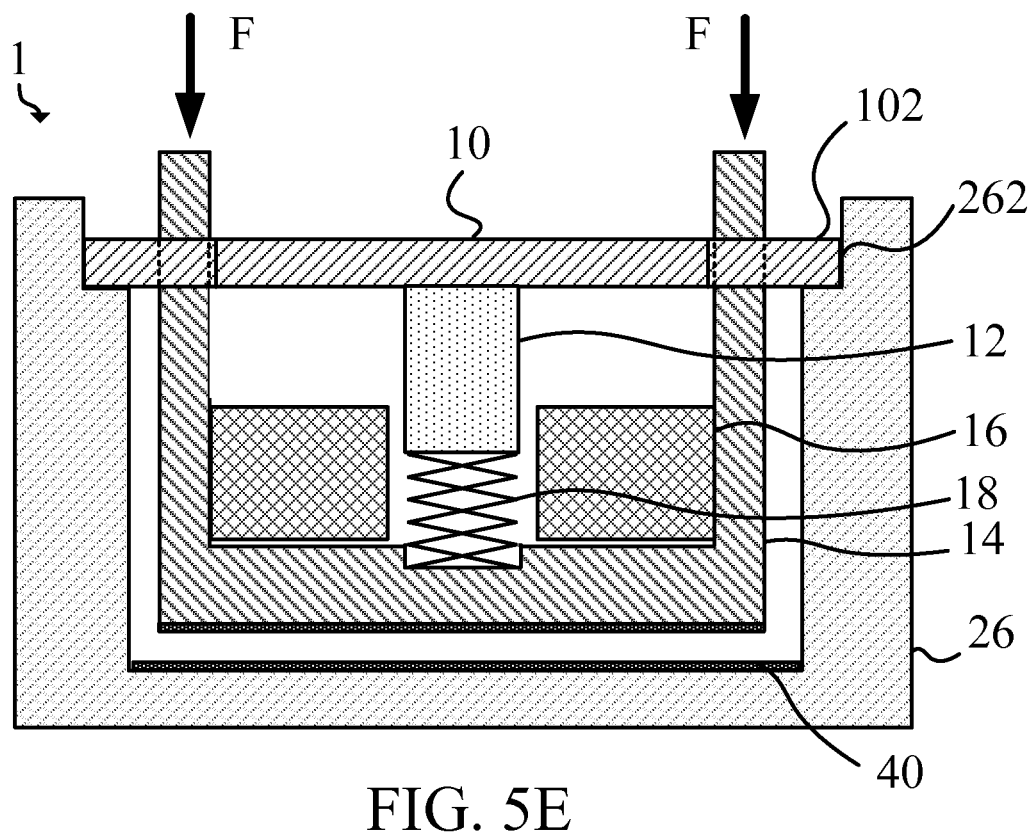
FIG. 5E is a sectional diagram illustrating a power generating device according to another embodiment of the invention.

Please refer to FIG. 5E. FIG. 5E is a sectional diagram illustrating a power generating device according to another embodiment of the invention. FIG. 5E shows another configuration of the elastic component 18 different from that of FIG. 5A. It should be noted that the first piezoelectric component 30 and the second piezoelectric component 40 in the above-mentioned embodiments deform to introduce potential differences between their two opposite surfaces and generate the first charge and the second charge corresponding to the pressure respectively. The first piezoelectric component 30 and the second piezoelectric component 40 can be made of one piezoelectric material, a combination of several piezoelectric materials, or more complex structure. The followings would describe the first piezoelectric component 30 and the second piezoelectric component 40 in detail according to another embodiment.

Figure 6A:
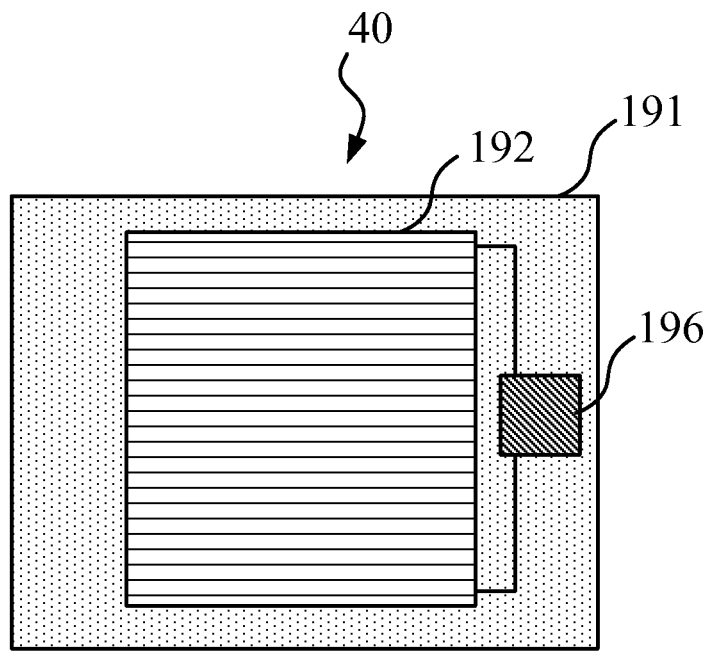
FIG. 6A is a schematic drawing illustrating a second piezoelectric component of the power generating device according to another embodiment of the invention.
Figure 6B:
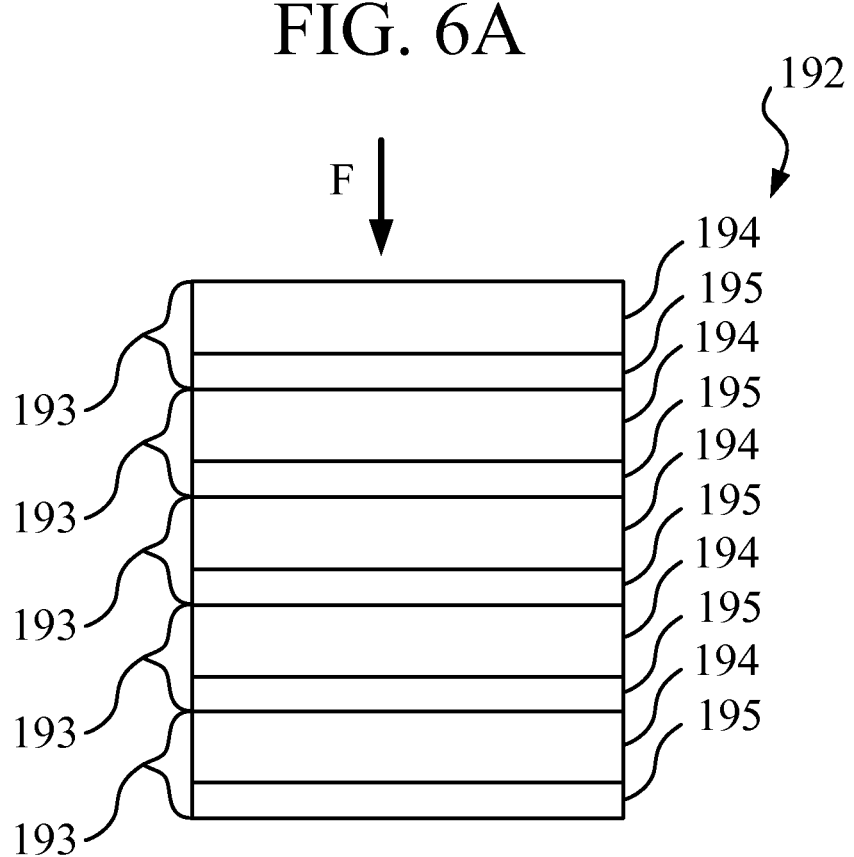
FIG. 6B is a schematic drawing illustrating a piezoelectric component of the power generating device according to another embodiment of the invention.

Please refer to FIG. 6A and FIG. 6B. FIG. 6A is a schematic drawing illustrating the second piezoelectric component of the power generating device according to another embodiment of the invention. FIG. 6B is a schematic drawing illustrating the piezoelectric component of the power generating device according to another embodiment of the invention. It should be noted that the second piezoelectric component is stilled marked as 40, and the piezoelectric component in FIG. 6B can be recognized as the first piezoelectric component 30 or the second piezoelectric component 40. In this embodiment, the first piezoelectric component 30 or the second piezoelectric component 40 includes an elastic object 191 and a piezoelectric unit set 192. The elastic object 191 has a first elastic coefficient, and the piezoelectric unit set 192 is configured in the elastic object 191 to generate a corresponding first charge and second charge. In detail, when the elastic object 191 is pressed and further presses the piezoelectric unit set 192, the piezoelectric unit set 192 generates the first charge and the second charge correspondingly. The electricity storing module 20 can be coupled to the first piezoelectric unit set 192 to receive and store the first charge or the second charge generated by the piezoelectric unit set 192. The stored electrical energy in electricity storing module 20 can be provided to the lighting module 22 and the control module 24. If the electricity storing module 20 is omitted, each of the power generating devices 1 can be directly connected to the lighting module 22 or connected to the lighting module 22 through a rectification component to provide the electrical energy.

The piezoelectric unit set 192 can be formed by a plurality of piezoelectric units 193 those are stacked and series connected to each other. Each of the piezoelectric units 193 has a second elastic coefficient and includes a piezoelectric material 194 and a metal plate 195. It should be noted that the amount of piezoelectric materials 194 and metal plates 195 are not limited to that of the embodiment, but decided according to the practical requirement.

The piezoelectric unit set 192 is configured in the elastic object 191 so that the elastic object 191 fixes and protects the piezoelectric unit set 192 to prevent the piezoelectric unit set 192 from damaging or falling out.

Please refer to FIG. 6B. FIG. 6B is a schematic drawing illustrating the piezoelectric unit set according to another embodiment of the invention. As shown in FIG. 6B, the piezoelectric unit set 192 is formed by series connecting a plurality of the piezoelectric units 193. Each of the piezoelectric units 193 includes a piezoelectric material 194 and a metal plate 195. The piezoelectric material 194 has a particular lattice so that the stress field and the electric field can be coupled together in the piezoelectric material 194. When the piezoelectric material 194 bears a pressure, the distances of the electric dipoles become shorter by the compression of the material. The piezoelectric material 194 generates isometric positive charges and negative charges on the opposite surfaces thereof to keep the distances of the electric dipoles, resulting in generating electric field, i.e., voltage. In practice, the piezoelectric material 194 can be made of ferroelectric crystal such as lithium niobate, tantalum niobate, potassium biphosphate, ammonium dihydrogen phosphate, and lead hydrogen phosphate, or other materials with piezoelectric effect.

In this embodiment, the piezoelectric material 194 is an output anode and the metal plate 195 is an output cathode. The piezoelectric material 194 and the metal plate 195 are stacked to each other to form the piezoelectric unit 193. The piezoelectric units 193 are series connected to each other to form the piezoelectric unit set 192. Compared to single piezoelectric unit, the piezoelectric unit set 192 including a plurality of piezoelectric units 193 can output higher voltage.

The elastic object 191 has a first elastic coefficient, and the piezoelectric unit set 192 has a second elastic coefficient. In this embodiment, the second elastic coefficient is higher than the first elastic coefficient, so that the deforming degree of the elastic object 191 would not be smaller than that of the piezoelectric unit set 192 when bearing the same external force F, and then the deformation of the piezoelectric unit set 192 would not be limited and the voltage generated by the piezoelectric unit set 192 would not be influenced. To avoid the electric leakage or short via the elastic object 191, it can be made of insulating materials. In practice, the elastic object 191 can be polymer such as silicone, butyl rubber, and silicone resin, or other materials with elasticity and insulating ability.

Please refer to FIG. 6A again. In this embodiment, the first piezoelectric component 30 or the second piezoelectric component 40 can further include a circuit 196 configured in the elastic object 191 and electrical connected the piezoelectric unit set 192. The circuit 196 can include a rectification component for rectifying or adjusting the first charges or the second charges generated by the piezoelectric unit set 192 to output a stable electrical energy. Besides the rectification component, the electricity storing module 20 can be integrated in the circuit 196.

The circuit 196 is configured in the elastic object 191 so that the elastic object 191 fixes and protects the piezoelectric unit set 192 and the circuit 196 at the same time to prevent them from damaging or falling out when the external force F acts. In this embodiment, the elastic object 191 can be made of a waterproof material and cover the piezoelectric unit set 192 and the circuit 196 completely to prevent them from damage by water.

As shown in FIG. 6A, when the external force F acts on the piezoelectric unit set 192, the piezoelectric unit set 192 bears the pressure and deforms to generate electricity energy by the piezoelectric effect. The circuit 196 can rectify the electricity energy and then transmit it to the electricity storing module 20 or directly to the lighting module 22 for driving the lighting module 22. Therefore, the lighting module 22 is capable of lighting without an external power source to achieve the energy saving function.

As described above, the power generating device of the invention can be used in the shoe pads or the ground pads. When a user steps on or presses the power generating device, it generates and stores the electricity energy to supply energy consuming device to work, such as supplying the LED to light. In other words, the energy consuming device integrated with the power generating device of the invention forms a green product needing no external power source or battery. The power generating device of the invention can be assembled in the shoes easily to automatically generate the electricity energy with the user's walking. It should be noted that the light module of the power generating device of the invention increases the identification rate in the night, and improves the traffic safety of the user.

Although the present invention has been illustrated and described with reference to the preferred embodiment thereof, it should be understood that it is in no way limited to the details of such embodiment but is capable of numerous modifications within the scope of the appended claims.

What is claimed is:

1. A power generating device, comprising:
   a first casing, having at least one first engagement part;
   a second casing, having at least one second engagement part, the second engagement part being movably coupled to the first engagement part to form a space between the first casing and the second casing;
   a magnetic component, fixed on the first casing;
   an induction coil, fixed on the second casing and configured in the space, the induction coil positioned outside the contour of the magnetic component; and
   a first piezoelectric component, configured between the magnetic component and the second casing, the first piezoelectric component comprising:
      an elastic object, having a first elastic coefficient; and
      a piezoelectric unit set, for generating the first charge, the piezoelectric unit set being configured in the elastic object and having a second elastic coefficient, wherein the second elastic coefficient is higher than the first elastic coefficient;
   wherein, when an external force acts on the power generating device, the first casing and the second casing move relatively to each other so that the induction coil generates an induced current by sensing a magnetic flux variation, and the first piezoelectric component generates a first charge by absorbing the pressure between the magnetic component and the second casing.

2. The power generating device of claim 1, further comprising:
   an electricity storing module, coupled to the induction coil and the first piezoelectric component to receive the induced current and the first charge and store them as a stored electrical energy;
   a lighting module, coupled to the electricity storing module and having at least one LED unit, the electricity storing module providing the stored electrical energy to the LED unit; and
   a control module, coupled to the lighting module, the control module being used for controlling the frequency, color, or pattern of the light emitted by the lighting module.

3. The power generating device of claim 1, further comprising:
an elastic component, configured between the first casing and the second casing, the first casing and the second casing moving relatively to each other and the elastic component providing a recovery force when the external force acts on the power generating device.

4. The power generating device of claim 1, further comprising:
a third casing, contacting the first casing and having a third engagement part for engaging the first engagement part;
wherein, the second casing and the third casing move relatively to each other when the external force acts on the power generating device.

5. The power generating device of claim 1, wherein the piezoelectric unit set is formed by a plurality of piezoelectric units stacked and series connected to each other, and each of the piezoelectric units has the second elastic coefficient and comprises a piezoelectric material and a metal plate.

6. A power generating device, comprising:
a first casing, having at least one first engagement part;
a second casing, having at least one second engagement part, the second engagement part being movably coupled to the first engagement part to form a space between the first casing and the second casing;
a magnetic component, fixed on the first casing;
an induction coil, fixed on the second casing and configured in the space, the induction coil positioned outside the contour of the magnetic component;
a third casing, having a third engagement part for engaging the first engagement part; and
a second piezoelectric component, configured between the second casing and the third casing;
wherein, when an external force acts on the power generating device, the first casing and the second casing move relatively to each other so that the induction coil generates an induced current by sensing a magnetic flux variation, and the second piezoelectric component generates a second charge by absorbing the pressure between the second casing and the third casing.

7. The power generating device of claim 6, further comprising:
an elastic component, configured between the first casing and the second casing, the first casing and the second casing moving relatively to each other and the elastic component providing a recovery force when the external force acts on the power generating device.

8. The power generating device of claim 6, further comprising:
an elastic component, configured between the second casing and the third casing, the second casing and the third casing moving relatively to each other and the elastic component providing a recovery force when the external force acts on the power generating device.

9. The power generating device of claim 6, further comprising:
a first piezoelectric component, configured between the magnetic component and the second casing;
wherein, when an external force acts on the power generating device, the first casing and the second casing move relatively to each other, and the first piezoelectric component generates a first charge by absorbing the pressure between the magnetic component and the second casing.

10. The power generating device of claim 6, further comprising:
an electricity storing module, coupled to the induction coil and the second piezoelectric component to receive the induced current and the second charge and store them as a stored electrical energy;
a lighting module, coupled to the electricity storing module and having at least one LED unit, the electricity storing module providing the stored electrical energy to the LED unit; and
a control module, coupled to the lighting module, the control module being used for controlling the frequency, color, or pattern of the light emitted by the lighting module.

11. A power generating device, comprising:
a first casing, having at least one first engagement part;
a second casing, having at least one second engagement part, the second engagement part being movably coupled to the first engagement part to form a space between the first casing and the second casing;
a magnetic component, fixed on the first casing and configured in the space; and
an induction coil, fixed on the second casing and configured in the space, the induction coil positioned outside the contour of the magnetic component;
wherein, when an external force acts on the power generating device, the first casing and the second casing move relatively to each other so that the induction coil generates an induced current by sensing a magnetic flux variation;
wherein, the at least one first engagement part extends over the second casing when the second engagement part is movably coupled to the first engagement part.

12. The power generating device of claim 11, further comprising:
a third casing, having a third engagement part for engaging the first engagement part; and
an elastic component, configured between the second casing and the third casing, the second casing and the third casing moving relatively to each other and the elastic component providing a recovery force when the external force acts on the power generating device.

13. The power generating device of claim 12, further comprising:
a second piezoelectric component, configured between the second casing and the third casing, when the external force acts on the power generating device the second piezoelectric component generates a second charge by absorbing the pressure between the second casing and the third casing.

14. A power generating device, comprising:
a first casing, having at least one first engagement part;
a second casing, having at least one second engagement part, the second engagement part being movably coupled to the first engagement part to form a space between the first casing and the second casing;
a magnetic component, fixed on the first casing;
an induction coil, fixed on the second casing and configured in the space, the induction coil positioned outside the contour of the magnetic component;
a third casing, having a convex ring fixed on the inside wall of the third casing for engaging and blocking the first engagement part; and
a second piezoelectric component, configured between the second casing and the third casing;
wherein, when an external force acts on the power generating device, the first casing and the second casing move relatively to each other so that the induction coil generates an induced current by sensing a magnetic flux variation, and the second piezoelectric component generates a second charge by absorbing the pressure between the second casing and the third casing.

* * * * *